US006948062B1

(12) United States Patent
Clapper

(10) Patent No.: US 6,948,062 B1
(45) Date of Patent: Sep. 20, 2005

(54) LOCATION DEPENDENT ENCRYPTION AND/OR DECRYPTION

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 795 days.

(21) Appl. No.: 10/017,539

(22) Filed: Dec. 12, 2001

(51) Int. Cl.[7] .................................................. G06F 1/24
(52) U.S. Cl. ...................... 713/162; 713/168; 713/200; 713/201
(58) Field of Search ................................ 713/162, 168, 713/200, 201

(56) References Cited

U.S. PATENT DOCUMENTS 6,125,457 A * 9/2000 Crisan et al. ................. 714/36
6,185,678 B1 * 2/2001 Arbaugh et al. ............... 713/2
6,272,631 B1 * 8/2001 Thomlinson et al. ....... 713/155
6,317,777 B1 * 11/2001 Skarbo et al. .............. 709/204

* cited by examiner

*Primary Examiner*—Thomas R. Peeso
(74) *Attorney, Agent, or Firm*—Steve D. Yates

(57) ABSTRACT

Encryption and decryption may be tied to physical location information, e.g., GPS or other position data. Decryption keys may be defined with respect to a location at which decryption is to occur. A clock may be used to ensure decryption is occurring at a desired decryption location. For security, names may be associated with GPS position data, where encrypted data and a name associated with position data may be provided to a recipient, and the recipient is required to know or have access to the position data associated with the name in order to compute a decryption key. For additional security, encryption may also be performed with respect to position data for an encryption location, where an identifier associated with the encryption location is provided to the recipient, and the recipient is required to know or have access to the position data associated with the second name. Other embodiments are disclosed.

30 Claims, 6 Drawing Sheets

LOCATION DEPENDENT ENCRYPTION AND/OR DECRYPTION

FIELD OF THE INVENTION

The invention generally relates to encryption, and more particularly to encryption and decryption based on location or position information.

BACKGROUND

There are many reasons why one might wish to encrypt information, and there are many known and unknown public and private key cryptosystems to perform the encrypting. However, except for requiring interaction with a data entry device at a particular location, such as entering a code on a keypad affixed to a building (e.g., an alarm keypad), current encryption techniques are location independent; it does not matter where encryption or decryption occurs, only that encryption and decryption devices have proper keys to perform encryption or decryption.

BRIEF DESCRIPTION OF THE DRAWINGS

The features and advantages of the present invention will become apparent from the following detailed description of the present invention in which.

DETAILED DESCRIPTION

Figure 1:
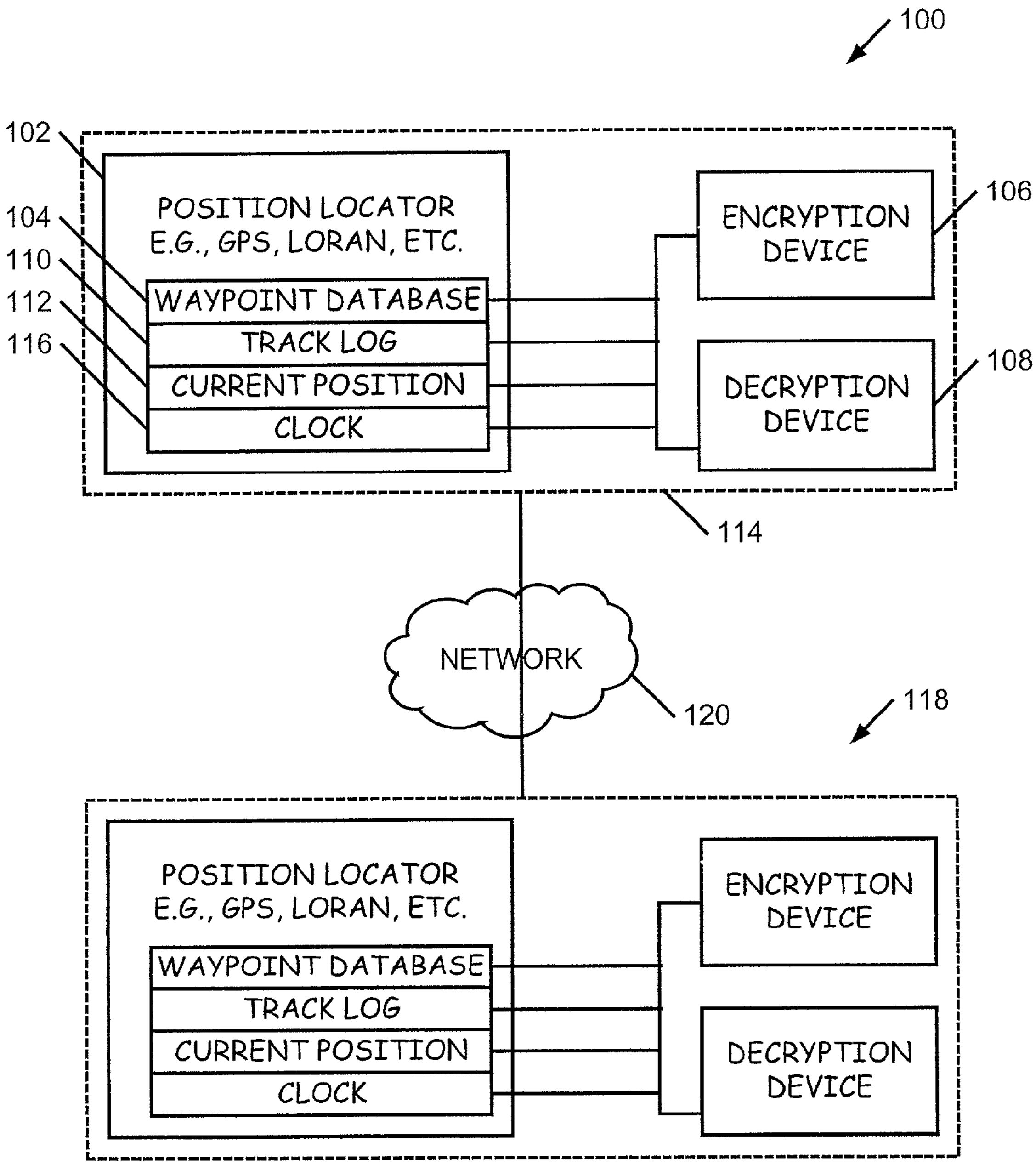
FIG. 1 illustrates an exemplary system 100 in which certain aspects of the invention may be practiced.

FIG. 1 illustrates an exemplary system 100 in which certain aspects of the invention may be practiced. Illustrated is a position locator device 102, such as a global positioning system (GPS) device. The GPS may be any one of a number of GPS devices available on the market, such one of those provided by Garmin Int'l of Olathe, KA, THALES Navigation (formerly Magellan Co.) of Santa Clara, Calif., or other GPS manufacturer. A GPS operates by processing received satellite signals to determine position, movement, and time; at least four GPS satellite signals are required to determine positions in three dimensions. It is assumed that the GPS provides typical functionality, including the ability to associate a symbol or name with waypoint data stored in a database. In the illustrated embodiment, the waypoint database 104 is stored within the GPS (or an associated device); however, it will be appreciated that the waypoint database could be stored remotely and accessed wirelessly.

Illustrated are encryption 106 and decryption 108 devices (or services) which may be configured to encrypt and decrypt data in accord with various encryption techniques. As illustrated, the encryption/decryption devices are communicatively coupled with the GPS 102, and may be configured to operate with conventional encryption or decryption keys, or with keys that are determined with respect to waypoint data in the waypoint database 104, positioning information received from a track log 110, or a current-position 112 read-out for the GPS.

It will be appreciated that different embodiments may provide only some of the illustrated position determination features 104, 110, 112 to encryption/decryption devices. And, although the GPS 102 and encryption/decryption devices are illustrated separately, it will be appreciated they may be combined into a single device 114, or be implemented as software operating within a machine (see, e.g., FIG. 6). For example, in another embodiment, not illustrated, a GPS and decryption-only device are combined; such a device may be useful in low-powered or processing-restricted environments that will not perform encryption. In addition, the illustrated system 100 may operate in conjunction with another system 118 over a network 120.

It will appreciated by one skilled in the art that GPS functionality is described for exemplary purposes only, and other positioning technology, coordinate systems, or geodetic reference systems may be utilized. For example one may use the well-known Long Range Navigation (Loran) system, in which a receiver measures time differences between terrestrial radio transmissions to triangulate a receiver's position. In the claims that follow, the phrase "spatial location" corresponds to coordinates or other position-identifying data provided by such position determination technology.

Thus, as will become more clear with reference to the following figures, data can be encrypted such that decryption must occur at or near a particular location. For example, a decryption key may be determined with respect to the desired decryption location. It will be appreciated that various techniques may be used to prevent location spoofing. For example, if encryption or decryption is only to occur at or near a particular location, a clock 116 within or associated with the GPS may be used to ensure real-time position information is used when performing encryption or decryption. Note that the disclosed encryption techniques are also applicable to data authentication (signing), to allow, for example, indication that a particular party sent data or received data at a particular location.

Figure 2:
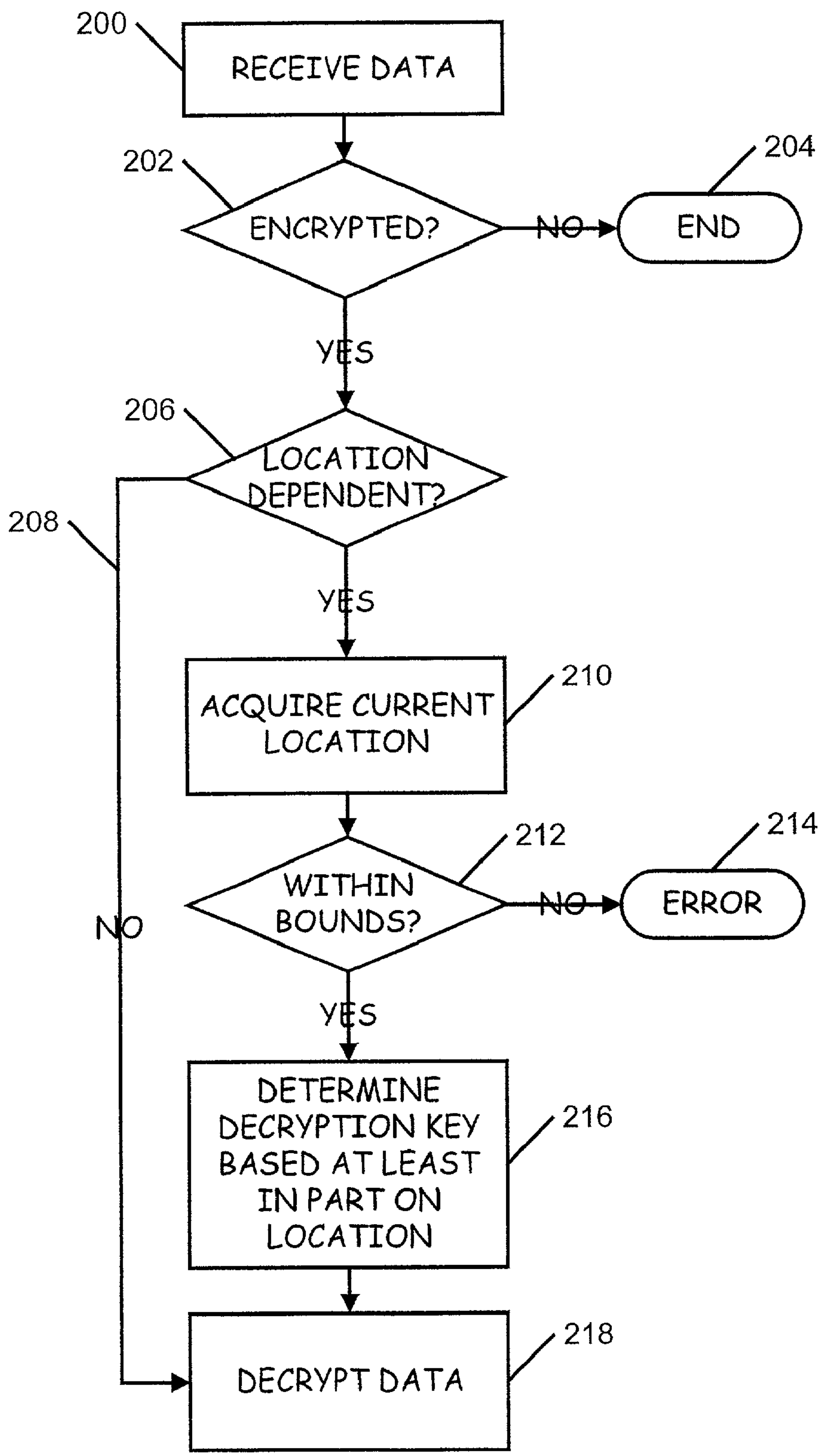
FIG. 2 illustrates decrypting data according to one embodiment of the invention where decryption must occur at a particular location.

FIG. 2 illustrates decrypting data according to one embodiment of the invention where decryption must occur at a particular location. Data is received 200, and a test 202 is performed to determine whether the data requires decryption. If not, then decryption ends 204, such as by providing the received data to another function or device which further processes the received data. If decryption is required, in the illustrated embodiment, a further test 206 is performed to determine whether the encryption is location dependent. If not, then processing may continue with a non-location based decryption 218. In another embodiment, location dependence may be assumed required or not as desired.

If location decryption is required, then a current location is acquired 210. As discussed above for FIG. 1, location may be determined with respect to a waypoint database 104, a track log 110, a current position 112 readout, or by some other location determination technique. A test 212 is performed to determine whether the current location is within a proscribed bounds. That is, since location determination technology may be imprecise, or simply to allow a decryption device position leeway, decryption may be authorized when decryption is attempted near a particular location. It will be appreciated that various techniques may be applied to effect position leeway.

Figure 3:
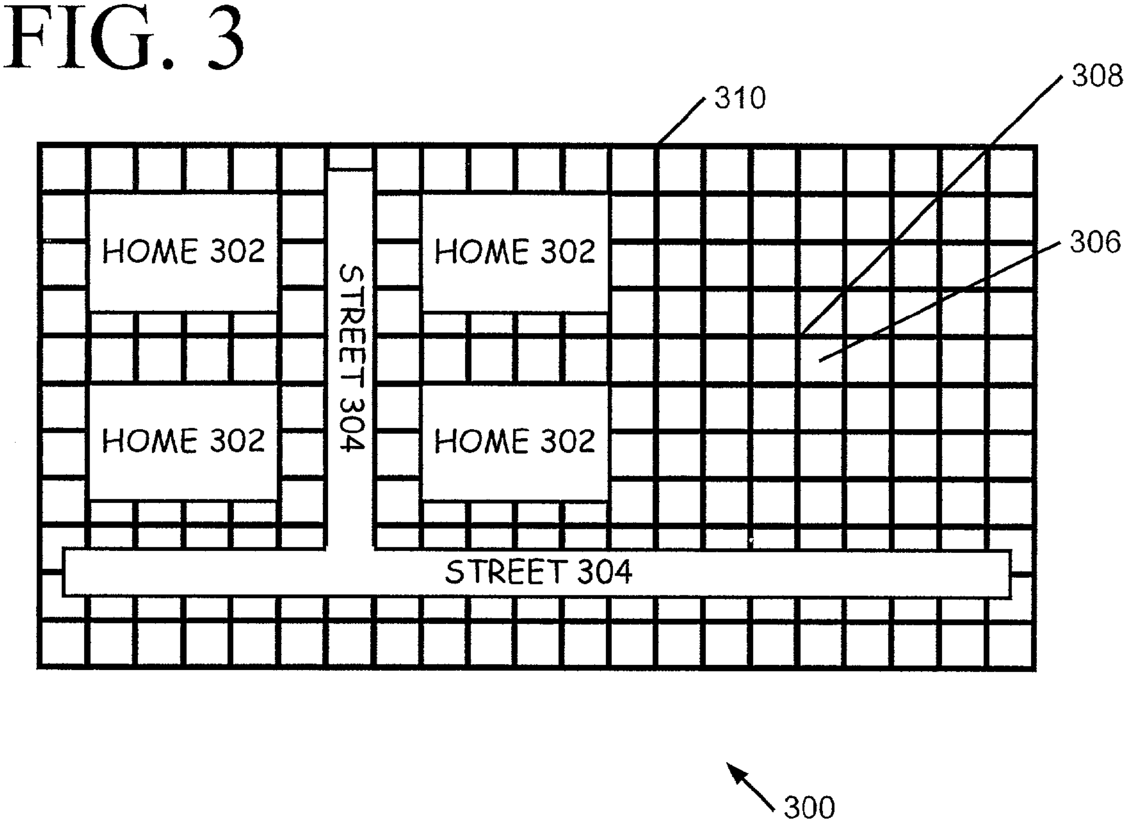
FIG. 3 illustrates an exemplary residential area including homes, streets, a target decryption area, and a leeway area in which decryption may successfully be performed.

For example, FIG. 3 illustrates an exemplary residential area 300 including some homes 302, streets 304, and a target decryption area 306. However, because there is often a margin of error with respect to location determination, to make the required decryption location be less exact, a decryption leeway area may be defined about the target decryption area 306. In the illustrated embodiment, decryption position leeway is defined with respect to a logical grid 310 that is overlaid a physical area, e.g., the residential area. A snap-to grid effect may be used to automatically select a grid location, e.g., location 308, for all positions determinations (including the target decryption area) within a grid square, and a decryption key determined with respect to the automatically selected grid location 308. It will be appreciated that grid spacing may be arbitrarily large to provide for any desired amount of decryption location leeway. It will be further appreciated that the illustrated uniform grid is exemplary only, and that other techniques, such as non-uniform and/or non-square grids, may be utilized instead.

Figure 4:
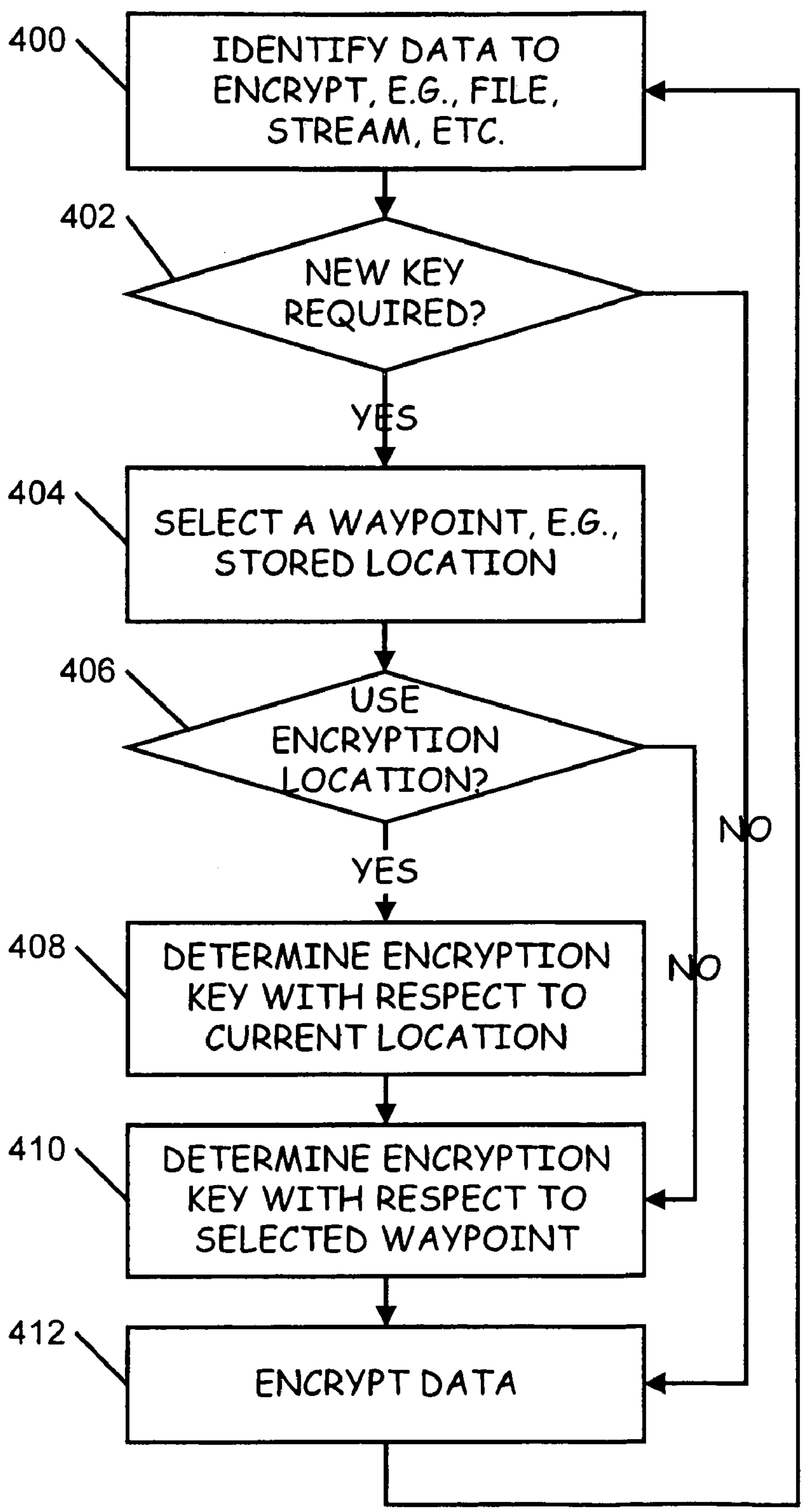
FIG. 4 illustrates, according to one embodiment of the invention, encrypting data with respect to a particular waypoint location.

FIG. 4 illustrates, according to one embodiment of the invention, encrypting data with respect to a particular waypoint location. Data to encrypt is identified 400; such data may be a data file stored on a disk, a portion of a memory, a section of streaming data, or some other data. A test 402 is performed to determine whether a new key is required. For example, the invention is not tied to a specific encryption technique, and therefore multiple encryptions operations may occur with a single key.

Assuming a new key is required, a waypoint is selected 404 for the encryption. The selected waypoint represents the location or area in which a decryption device must be present in order for decryption to occur, and therefore it is used to select an encryption key. A test 406 is performed to determine whether an encryption location, e.g., the present location of the encryption device, or another location or waypoint, should also be used to select the encryption key. Use of the encryption location requires a recipient of encrypted data to know the encryption location in order to perform a decryption. Such a location may be known in advance to legitimate users of a decrypting device, and thus serve as additional security. Assuming the encryption location is used, an encryption key is therefore determined 408, 410 with respect to the encryption location and the selected waypoint. However, if the encryption location was not used, then encryption key is determined 410 with respect to the selected waypoint.

The identified data is then encrypted 412 with the determined encryption key. It will be appreciated that various cryptographic techniques may be applied to determine an encryption key that is reversible only when a decryption device is at (or, if desired, only near) the selected waypoint. Processing may then repeat with identifying 400 data to encrypt, and testing 402 whether a new key is required. If a new key is not required, processing jumps to encrypting 412 the data with the previous key.

Figure 5:
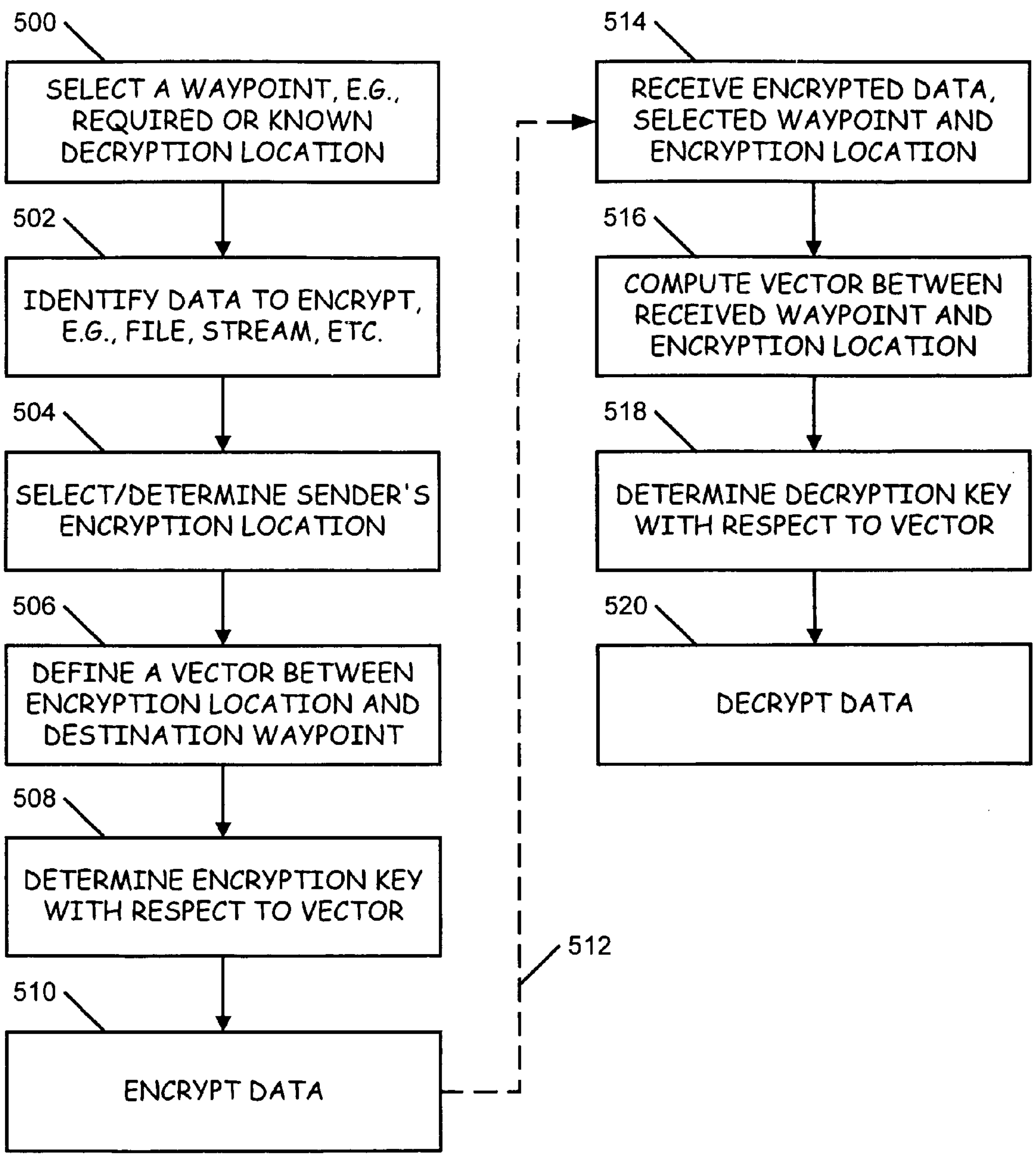
FIG. 5 illustrates encrypting and decrypting data according to one embodiment of the invention.

FIG. 5 illustrates encrypting and decrypting data according to one embodiment of the invention. Prior to performing an encryption, a waypoint is selected 500. The selected waypoint corresponds to a known decryption location; it is assumed a decryption device is required to be at or near the selected waypoint location in order to decrypt encrypted data. Data to encrypt, e.g., a file stored within a file system, a data stream, a register, etc., is selected 502 for encrypting. For simplicity, assume a sender seeks to securely send a file to a recipient.

The sender's encryption location is determined 504. As discussed above with respect to FIG. 1, the encryption location may be determined based on data acquired from a GPS or other position locator device. Alternatively, the sender's location may be selected from a database, e.g., a waypoint database, of known locations. This allows encryption to be based with respect to a location other than the sender's current physical location, and may be used to increase security, e.g., the encryption location may be kept secret, and a recipient of encrypted may be required to know the encryption location to decrypt.

A vector is then defined 506 with respect to the determined 504 encryption location and selected 500 waypoint. As used herein, the term vector is used in the mathematical sense, e.g., a mathematical representation of a direction and a magnitude, or distance between the encryption location and the waypoint. An encryption key is then determined 508 with respect to the defined vector. In one embodiment, the entire vector is used in determining the encryption key, e.g., as input to a key determination function; in an alternate embodiment, only a portion of the vector is used, possibly in conjunction with other data. It will be appreciated that although the illustrated embodiment utilizes a vector, an alternate embodiment may define a different relation between the encryption location and the waypoint, where this alternate relation is used at least in part to determine the encryption key. The data may then be encrypted 510.

The encrypted data may then be provided 512 to a recipient, e.g., via a wireless transfer, physical transfer, etc. Along with the encrypted data, the recipient receives 514 the waypoint selected by the sender, and the sender's encryption location. To further increase security, in one embodiment, instead of providing the recipient with waypoint position data, e.g., the GPS values corresponding to a particular physical location, instead only the name or symbol associated with the waypoint is provided to the recipient. In this embodiment, the recipient is therefore required to understand the reference to the waypoint and be able to retrieve the waypoint position data, e.g., the recipient is required to have access to a waypoint database cross-referencing provided name or symbol with position data, e.g., GPS values, for the waypoint.

The recipient then computes 516 a vector between the position data for the received waypoint and the sender's encryption location. In one embodiment, the recipient is provided with the position data for the sender's encryption location. In another embodiment, for added security, as with sending the selected 500 waypoint, the recipient may only be provided with a symbol or name corresponding to a waypoint for the sender's encryption location. The recipient then uses the vector to determine 518 a decryption key for decrypting the received data. In one embodiment, the entire vector is used in determining the decryption key, e.g., as input to a key determination function; in an alternate embodiment, only a portion of the vector is used, possibly in conjunction with other data. As discussed above, it will be appreciated that instead of a vector, other relationships between the encryption location and the selected waypoint may be used.

Once the decryption key is determined, it is then used to decrypt 520 data. As discussed above, successful decryption may be contingent on the decryption occurring at or near the selected waypoint. For example, creation or use of the decryption key may be restricted to a real-time operation occurring at or near the selected waypoint. Location determination may be performed arbitrarily precisely depending on location technology employed. For example, while GPS systems provide results accurate within a few yards, other technologies such as terrestrial-broadcast based systems, military systems, or the like, may provide precision within a few inches. In various embodiments, decryption and encryption may be conditioned on occurring at a precise location, and with precise location determination, such locations may be described with non-coordinate data, e.g., the "northwest corner" of a particular room, or at some position determined with respect to an address or a landmark. Such non-coordinate location information increases the burden on one seeking to intercept encoded data. In one embodiment, location information may be provided in advance such as by way of a telephone call, E-mail message, instant message, etc.

In one embodiment, in addition to determining encryption or decryption with respect to non-coordinate data, encryption or decryption may be determined with respect to an offset from a measured spatial point. For example, a predetermined vector offset from an automatically measured spatial point may be used. Such offsets could be installed in sender/receiver or encoder/decoder systems to improve security. In one embodiment, a progressive offset database may be used, or offset values calculated in relation to time, date, etc. Such offsets may foil attempts at capturing location data or observing the whereabouts of an sender or receiver.

Figure 6:
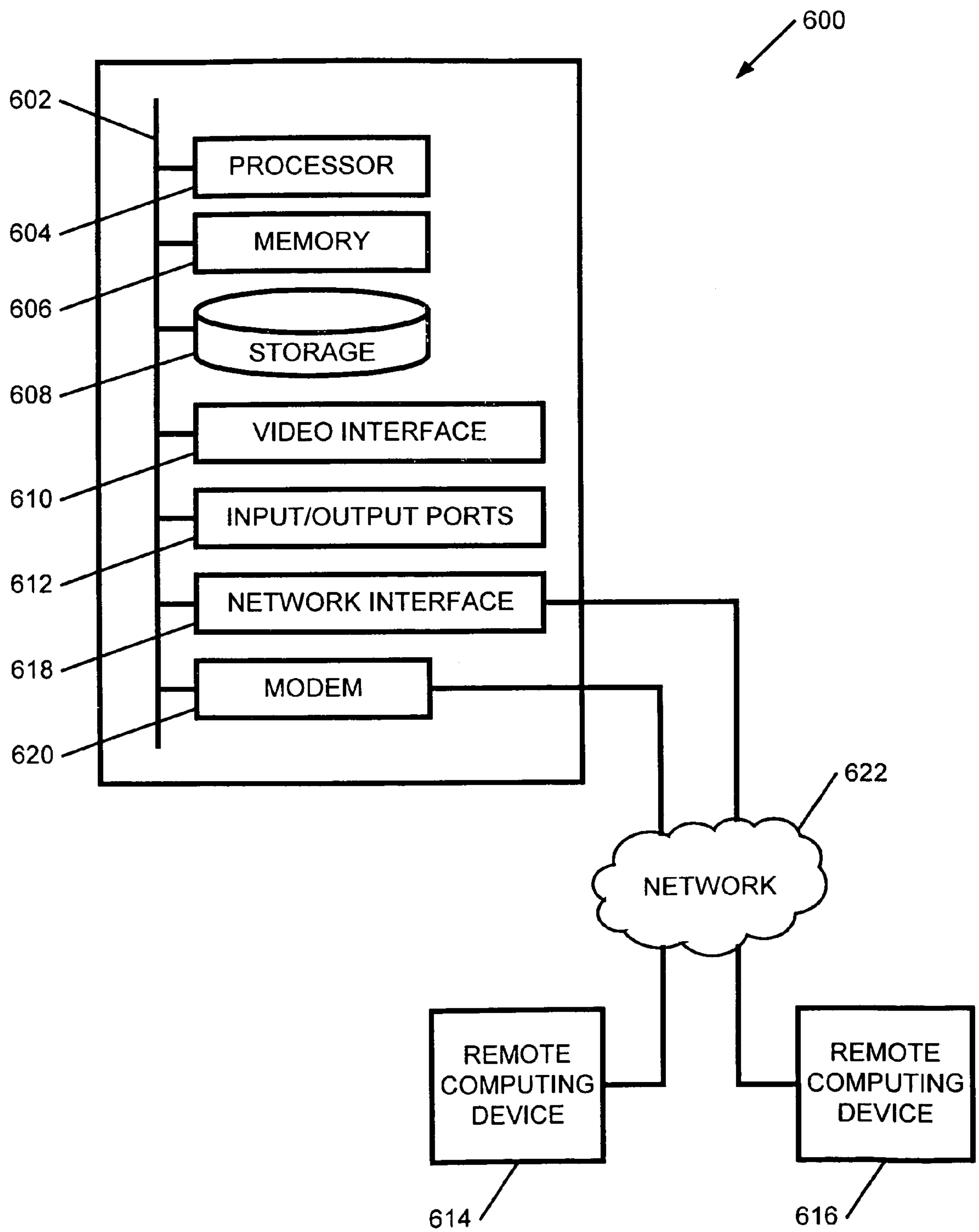
FIG. 6 illustrates a suitable computing environment in which certain aspects of the invention may be implemented.

FIG. 6 and the following discussion are intended to provide a brief, general description of a suitable computing environment in which certain aspects of the illustrated invention may be implemented.

An exemplary environment for embodying, for example, the position locator/encryption/decryption device 114 of FIG. 1, includes a machine 600 having system bus 602. As used herein, the term "machine" includes a single machine, such as a computer, handheld device, or other machine, or a system of communicatively coupled machines or devices. Typically, attached to the bus are processors 604, a memory 606 (e.g., RAM, ROM), storage devices 608, a video interface 610, and input/output interface ports 612. The machine 600 may be controlled, at least in part, by input from conventional input devices, such as keyboards, mice, joysticks, as well as directives received from another machine, a user's interaction with a virtual reality (VR) environment, biometric feedback, e.g., data incident to monitoring a person, plant, animal, organism, etc., or other input.

The system may also include embedded controllers, such as Generic or Programmable Logic Devices or Arrays, Application Specific Integrated Circuits, single-chip computers, smart cards, or the like, and the system is expected to operate in a networked environment using physical and/or logical connections to one or more remote machines 614, 616 through a network interface 618, modem 620, or other data pathway. Machines may be interconnected by way of a wired or wireless network 622, such as the network 120 of FIG. 1, an intranet, the Internet, local area networks, wide area networks, cellular, cable, laser, satellite, microwave, "Bluetooth" type networks, optical, infrared, or other short range or long range wired or wireless carrier.

The invention may be described by reference to or in conjunction with program modules, including functions, procedures, data structures, application programs, etc. for performing tasks, or defining abstract data types or low-level hardware contexts. Program modules may be stored in memory 606 and/or storage devices 608 and associated storage media, e.g., hard-drives, floppy-disks, optical storage, magnetic cassettes, tapes, flash memory cards, memory sticks, digital video disks, biological storage. Program modules may be delivered over transmission environments, including network 622, in the form of packets, serial data, parallel data, propagated signals, etc. Program modules may be used in a compressed or encrypted format, and may be used in a distributed environment and stored in local and/or remote memory, for access by single and multi-processor machines, portable computers, handheld devices, e.g., Personal Digital Assistants (PDAs), cellular telephones, etc.

Thus, for example, with respect to the illustrated embodiments, assuming machine 600 operates as a first system 100 of FIG. 1 for encrypting data, then remote machines 614, 616 may respectively be a second system 118 of FIG. 1 for decrypting received encrypted data, and a waypoint data server wirelessly accessible by the second system 118 to provide waypoint data for determining decryption keys. It will be appreciated that remote machines 614, 616 may be configured like machine 600, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for encrypting data, comprising:

identifying a first spatial location for a current location;

selecting a known location having a second spatial location;

determining an encryption key based at least in part on the first spatial location and the second spatial location; and encrypting data with respect to the encryption key.

2. The method of claim 1, further comprising:

identifying the first spatial location with a global positioning system.

3. The method of claim 1, wherein determining the encryption key comprises:

determining a vector between the first spatial location and the second spatial location.

4. The method of claim 3, wherein the vector comprises a direction component and a magnitude component.

5. The method of claim 4, wherein the direction and magnitude components are determined with respect to the first spatial location.

6. The method of claim 1, wherein the second spatial location corresponds to a landmark.

7. The method of claim 1, further comprising:

sending to a receiver the first spatial location and an identifier associated with the known location that does not identify the second spatial location;

wherein the receiver is configured to lookup the second spatial location associated with the known location.

8. The method of claim 7, wherein the receiver is further configured to determine a decryption key based at least in part on the sent first spatial location and the looked up second spatial location.

9. The method of claim 1, further comprising:

sending to a receiver a first identifier associated with the first location that does not identify the first spatial location; and sending to the receiver a second identifier associated with the known location that does not identify the second spatial location;

wherein the receiver is configured to lookup the first spatial location associated with the first identifier, and to lookup the second spatial location associated with second identifier.

10. The method of claim 9, wherein the receiver is further configured to determine a decryption key based at least in part on the sent first spatial location and the looked up second spatial location.

11. A method for encrypting data, comprising:

determining a first spatial location for an encryption location;

determining an encryption key based at least in part on the first spatial location; and encrypting data with respect to the encryption key so that encrypted data may be decrypted by a decryption device having an input for receiving a current spatial location and configured to determine a decryption key based at least in part on the current spatial location.

12. The method of claim 11, further comprising:

receiving at least one signal comprising data with which to perform the determining the first spatial location.

13. The method of claim 11, further comprising:

receiving at least three positioning signals; and determining the first spatial location by triangulating with respect to the at least three positioning signals.

14. The method of claim 11, wherein the first spatial location is determined with a global positioning system (GPS) device.

15. The method of claim 11, wherein the decryption device must be near the encryption location when decrypting data that was encrypted with respect to the encryption location.

16. An article, comprising a machine-accessible media having associated instructions for performing encryption, wherein the instructions, when accessed, results in a machine performing:

identifying a first spatial location for a current location;

selecting a known location having a second spatial location;

determining an encryption key based at least in part on the first spatial location and the second spatial location; and encrypting data with respect to the encryption key.

17. The article of claim 16 wherein the machine-accessible media further includes instructions, when accessed by the machine, results in the machine performing:

identifying the first spatial location with a global positioning system.

18. The article of claim 16, wherein the machine-accessible media further includes instructions, when accessed by the machine, results in the machine performing:

determining a vector between the first spatial location and the second spatial location.

19. The article of claim 18, wherein the vector comprises a direction component and a magnitude component.

20. The article of claim 19, wherein the direction and magnitude components are determined with respect to the first spatial location.

21. The article of claim 16, wherein the second spatial location corresponds to a landmark.

22. The article of claim 16, wherein the machine-accessible media further includes instructions, when accessed by the machine, results in the machine performing:

sending to a receiver the first spatial location and an identifier associated with the known location that does not identify the second spatial location;

wherein the receiver is configured to lookup the second spatial location associated with the known location.

23. The article of claim 22, wherein the receiver is further configured to determine a decryption key based at least in part on the sent first spatial location and the looked up second spatial location.

24. The article of claim 16, wherein the machine-accessible media further includes instructions, when accessed by the machine, results in the machine performing:

sending to a receiver a first identifier associated with the current location that does not identify the first spatial location; and sending to the receiver a second identifier associated with the known location that does not identify the second spatial location;

wherein the receiver is configured to lookup the first spatial location associated with the first identifier, and to lookup the second spatial location associated with second identifier.

25. The article of claim 9, wherein the receiver is further configured to determine a decryption key based at least in part on the sent first spatial location and the looked up second spatial location.

26. An article, comprising a machine-accessible media having associated instructions for performing encryption, wherein the instructions, when accessed, results in a machine performing:

determining a spatial location for an encryption location;

determining an encryption key based at least in part on the spatial location; and encrypting data with respect to the encryption key so that encrypted data may be decrypted by a decryption device having an input for receiving a first spatial location and configured to determine a decryption key based at least in part on the first spatial location.

27. The article of claim 26 wherein the machine-accessible media further includes instructions, when accessed by the machine, results in the machine performing:

receiving at least one signal comprising data with which to perform the determining the spatial location.

28. The article of claim 26 wherein the machine-accessible media further includes instructions, when accessed by the machine, results in the machine performing:

receiving at least three positioning signals; and determining the spatial location by triangulating with respect to the at least three positioning signals.

29. The article of claim 26, wherein the spatial location is determined with a global positioning system (GPS) device.

30. The article of claim 26, wherein the decryption device must be near the encryption location when decrypting data that was encrypted with respect to the encryption location.

* * * * *